United States Patent Office 2,951,822
Patented Sept. 6, 1960

2,951,822

PREPARATION OF POLYGLYCIDYL AROMATIC AMINES AND RESINOUS COMPOSITIONS MADE THEREFROM

Norman H. Reinking, Millington, N.J., assignor to Union Carbide Corporation, a corporation of New York No Drawing. Filed Nov. 23, 1956, Ser. No. 623,824

22 Claims. (Cl. 260—42)

This invention relates to the production of polyglycidyl derivatives of aromatic amines and to resinous compositions made therefrom. More especially, it relates to the efficient production of polyglycidyl aromatic amines having a high epoxy content and to resinous compositions prepared therefrom, said compositions having desirable workability characteristics in the uncured state and high heat distortion in the cured state.

To facilitate understanding of the present invention it is noted here that the term "polyglycidyl aromatic amines" refers to primary aromatic amines which have substantially all of the amine hydrogens substituted by a glycidyl group

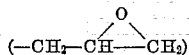

Thus, the polyglycidyl derivative of aniline can be represented as follows:

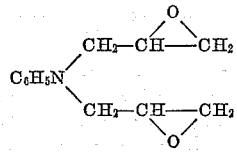

The polyglycidyl derivatives of aromatic amines are not novel, having been prepared for evaluation as tumor-inhibiting substances. However, the yields obtained were only about 36% of theory. Moreover, the usefulness of the polyglycidyl derivatives of aromatic amines as an important addition to the arsenal of resin-making substances was not disclosed or appreciated prior to this invention.

Accordingly, it is an object of this invention to provide an efficient process for making polyglycidyl derivatives of aromatic amines having a high epoxy content.

Another object of this invention is to furnish useful resinous compositions prepared with glycidyl derivatives of aromatic amines, per se or in admixture, and suitable hardening agents.

A more specific object is to provide casting compositions containing glycidyl ethers of bis-phenols in addition to the polyglycidyl derivatives of amines, said compositions being readily pourable and heat-curable to products having high heat distortion.

Other objects will be apparent from the following description.

The preparation of the glycidyl derivatives of aromatic amines involves the reaction of a halohydrin with an aromatic amine. Illustrative of the preparation of such a glycidyl derivative is the reaction between epichlorohydrin and a primary amine such as aniline. This reaction can be represented as follows:

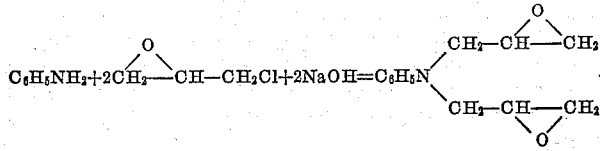

According to this equation, an amount of halohydrin is required equal to the number of moles of aromatic amine multiplied by twice the number of primary amine groups. Using this amount, the glycidyl derivatives have been prepared as aforesaid but in yields of only about 36%. If a lesser amount of halohydrin is used, e.g. an amount equimolar with the amine, then polymeric substances which are relatively low in glycidyl derivatives are obtained.

Now it has been discovered that these glycidyl derivatives of aromatic amines containing approximately 80% or better of theoretical amount of epoxy in the glycidyl derivative can be prepared in good yield.

In carrying out the process of this invention, the reaction of a halohydrin, such as epichlorohydrin, with an aromatic amine is advantageously carried out in two stages: the first stage leading to the preparation of the chlorohydrin, and the second stage involving the dehydrochlorination of the chlorohydrin amine with the formation of the glycidyl amine. These two stages of the reaction can be represented as follows, RNH₂ representing an aromatic amine and MOH a metallic base.

First stage:

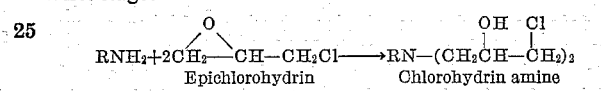

Second stage:

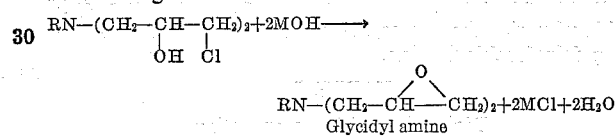

It will be noted from these formulations that the first stage is carried out in the absence of alkali while the second stage requires an alkaline agent to effect the dehydrochlorination.

It has been found that if the first stage is carried to completion before initiating the second stage it is possible to prepare glycidyl amines of about 80% or better epoxy content in almost theoretical yield. If stages one and two are combined, and the amine is reacted with epichlorohydrin in the presence of an alkali, then high polymeric impurities from which it is difficult to isolate the glycidyl amines are formed.

Moreover, it has been discovered that the yield and epoxy content of the glycidyl amines is also improved if an excess of the halohydrin is used in the first stage. This excess is readily recoverable before proceeding to the second stage. Removal of excess halohydrin upon completion of the first stage is desirable to avoid not only loss of the halohydrin but also to avoid the formation of impurities like glycerol and the waste of alkali.

The first stage of the process, according to this invention, is carried out by reacting the aromatic amine with the halohydrin at temperatures not in excess of about 80° C., for example, between about 25°–80° C., until a test shows the desired reduction in epoxy content as indicated by titration with pyridine hydrochloride.

This titration is carried out as follows: One gram of the material to be analyzed is heated in an excess of pyridine containing pyridine hydrochloride (made by adding 16 cc. of concentrated hydrochloric acid per liter of pyridine) at the boiling point for twenty minutes and back titrating the excess pyridine hydrochloride with 0.1 N sodium hydroxide using bromcresol purple as indicator and considering that one mole of HCl is equivalent to one epoxide group. The result is usually expressed as an epoxy equivalent which means the number of grams of product that contain one mole equivalent of epoxy. Or it may be expressed as an epoxy content which is the percent of theoretical epoxy and can be calculated by dividing the equivalent weight of the pure glycidyl amine by the epoxy equivalent. For example, the mole epoxy equivalent weight of diglycidyl aniline is 102.5. A reaction product having an epoxy equivalent of 117 would have an epoxy content of $$\frac{102.5}{117} = 87\%$$

The time required for completion of the first stage of the reaction is normally about five hours at the higher temperatures to four days at the lower temperatures. The addition of a compatible amount of water, for example, about one mole per amino hydrogen, to the reaction mixture has been found to accelerate the reaction. Temperatures around 50°–60° C. are preferred although lower temperatures yield a product of somewhat higher epoxy content. Temperatures higher than 80° C. tend towards the formation of undesirable polymers.

Usually, an excess of halohydrin is employed since by so doing a product is obtained having a higher epoxy content. This is illustrated in Table I which summarizes data obtained where the reaction between aniline and epichlorohydrin is carried out using stoichiometric amounts and also from 100 to 200% molar excess of epichlorohydrin, the excess being distilled off before effecting dehydrochlorination.

TABLE I

*Diglycidyl aniline preparation*

| Epichlorohydrin in Excess (molar percent) | 0 | 100 | 200 |
|---|---|---|---|
| Product: | | | |
| Epoxy Equivalent | 122 | 117 | 117 |
| Epoxy Content, percent | 84 | 87 | 87 |

While Table I indicates that products of better than 80% epoxy content can be obtained without using an excess of the chlorohydrin it has been found it desirable for best results to use an excess of the halohydrin up to about 300% (molar) excess. This is particularly true when reacting the higher molecular weight aromatic amines whereby a too high concentration of amine in halohydrin is avoided.

After completion of the first stage of the reaction the excess halohydrin is distilled off, e.g., under reduced pressure (10–20 mm. Hg) to a residue temperature of about 90°–95° C.

The second stage of the reaction requires a stoichiometric amount of alkali and it has been found advantageous to employ about 5–25% in excess of this amount in order to insure substantially complete dehydrochlorination. The alkali is usually added to the chlorohydrin amine reaction mixture in the form of a 50% by weight aqueous solution. The addition may be made quite rapidly, the temperature being maintained at about 50°–60° C. On completion of the dehydrochlorination any excess of alkali is washed out with water or can be neutralized with a weak acid, such as boric acid, and the salts are removed by filtration or centrifugation. The water layer is then separated from the organic layer containing the glycidyl amine, which is washed several times with water and then stripped of volatiles by distillation under reduced pressure.

If desired, the dehydrochlorination step may be effected in the presence of a solvent mixture such as toluene-alcohol, the toluene being a solvent for the glycidyl amine, while the alcohol is a solvent for the chlorohydrin amine and the aqueous solution of caustic. However, this introduces a solvent recovery step and for most purposes it is sufficient to effect the dehydrochlorination in the absence of a solvent.

The aromatic amines which have been found useful for the preparation of glycidyl derivatives by the method of this invention are those which are free of non-amino groups reactive with a halohydrin. Examples of suitable amines are the aromatic monoamines, such as aniline; or the ring-alkylated anilines, such as para-toluidine, or para-ethyl aniline; or the ring halogenated anilines, such as m-chloro aniline. Suitable also are aromatic diamines, such as meta and para phenylene diamine, benzidene and 4,4'-diamino diphenyl methane.

The suitable aromatic amines, when reacted with epichlorohydrin, the preferred chlorohydrin of this invention, yield glycidyl derivatives which vary from liquids having viscosities of 10 centistokes and higher to viscous resins. The properties and characteristics of a number of such derivatives are given in Table II.

TABLE II

*Properties of glycidyl derivatives*

| Aromatic Amines | Theo. Number Epoxy Groups | Viscosity, cst. at 25° C. | Epoxy Content, percent |
|---|---|---|---|
| 2,6-Dimethyl Aniline | 2 | 21.6 | 80.9 |
| Aniline | 2 | 46.9 | 97.0 |
| p-Toluidine | 2 | 55.8 | 91.0 |
| m-Chlor Aniline | 2 | 520 | 80.0 |
| p-Amino Diphenyl | 2 | 10,000 | 78.5 |
| m-Phenylene Diamine | 4 | 38,400 | 81.3 |
| p-Phenylene Diamine | 4 | 40,000 | 81.3 |
| 4,4'-Diamino Diphenyl Methane | 4 | 50,000 | 89.4 |
| Benzidine | 4 | (a) 13,000 | 85.0 |

(a) At 60° C.

As illustrative of the preparation of the glycidyl derivatives of this invention, the details for the preparation of diglycidyl aniline are given in Example I and for the preparation of the tetraglycidyl derivative of 4,4'-diamino diphenyl methane are given in Example II.

EXAMPLE I

Aniline _____ 930 grams (10 m.)
Epichlorohydrin (98.5%) _____ 1880 grams (20 m.)
Water _____ 180 grams (10 m.)

The ingredients were mixed, whereupon a cloudy light-green solution was obtained. The solution, upon analysis, was found to contain 6.67 meq. epoxide per gram (theory 6.69). This solution was then heated to 80° C. and held at 80° C. for five hours. The reaction was vigorously exothermic during the first 70 minutes.

Samples for epoxy analyses were removed each hour and analyzed with the results as given below:

| Hours at 80° C. | Epoxy, meq./gm.[1] | Moles Epichlorohydrin Reacted per Mole of Aniline |
|---|---|---|
| 0 | 6.67 | 0.06 |
| 1 | 0.59 | 1.82 |
| 2 | 0.23 | 1.93 |
| 3 | 0.17 | 1.95 |
| 4 | 0.10 | 1.97 |
| 5 | 0.03 | 1.99 |

[1] Meq./gm. milliequivalents per gram.

1960 grams of 50% aqueous NaOH (24.5 moles) were then added to the reaction according to the following schedule: the first 80% (1568 g.) in three hours at 60° C., and the next 20% (392 g.) in one hour at 50° C.

The contents were allowed to react an additional hour at 50° C. and then were washed four times with 3000 g. H₂O/wash, the water layer being removed by decantation, The washed resin was stripped to 140° C./29".
A yield of 1879 grams (97% of theory, corrected for samples withdrawn) of fluid amber liquid was obtained, analyzing as follows:

> Epoxy equivalent, 123.4 gram/gram mole
> Epoxy content, 83%
> Viscosity at 25° C., 125 cst.

Distillation of this product at reduced pressure produced water white material, the bulk of which distilled at 139° C./0.5 mm. and gave the following results on analysis:

> Epoxy equivalent, 106 grams/gram mole
> Epoxy content, 96.7%
> Molecular weight, 225 (theory 205)
> Viscosity at 25° C., 46.9 cst.

EXAMPLE II

| | |
|---|---|
| 4,4'diamino diphenyl methane (bisaniline F) | 99.2 g. (0.5 m.). |
| Epichlorohydrin (98.5%) | 780 g. |
| Alcohol (95%) | 195 g. |
| Water | 25 g. |

The amine was dissolved in the epichlorohydrin-alcohol-water mixture at room temperature. The solution was then heated to, and held at, 80° C. for four hours. At this point analysis indicated two moles of epichlorohydrin had been consumed (epoxy found, 5.80 meq./gm.; theory 5.85 meq./gm.).

The reaction mixture was cooled to 60° C.
There were added 200 grams of 50% NaOH (2.5 moles) over a period of 3⅓ hours at 60° C. The contents were held an additional 30 minutes at 60° C., then stripped under vacuum to 65° C./27". 350 grams of toluene were added to the residue, and this solution was washed four times with 300 g. $H_2O$. Each time the water layer was removed by decantation. The toluene solution was then stripped to 140° C./29". A yield of 210 grams (99% of theory) of amber, viscous liquid, analyzing as follows, was obtained:

> Epoxy equivalent, 118 grams/gram mole
> Epoxy content, 89.4%
> Viscosity at 28° C., 37,000 cst.

The polyglycidyl amines prepared according to the methods described in this invention are characterized by a number of desirable properties. They have a high epoxy content and are substantially free of high polymeric products. They also possess a high functionality associated with a relatively low viscosity. Thus, the glycidyl derivatives of the monoaromatic amines are, in general, low viscosity liquids ranging in viscosities from 10 to 10,000 centistokes at 25° C. while the glycidyl derivatives of the aromatic diamines are somewhat more viscous materials, varying in viscosity from 10,000 to 50,000 centistokes at 25° C.

The glycidyl amines of this invention are quite stable, e.g., the viscosity of a sample of diglycidyl aniline remained unchanged after storage for eight months at room temperature. A similar sample heated to 160° C. did not gel after four hours. With appropriate catalysts or hardeners, however, the glycidyl amines gel quite rapidly. Thus, a sample of diglycidyl aniline heated with an equivalent amount of an amine such as diethylene triamine, gels in 25 seconds at 160° C.

The polyglycidyl amines described herein can be used in the preparation of thermosetting casting compositions. Such compositions comprise a polyglycidyl amine, a hardener and a catalyst or a polyglycidyl amine and a combined hardener and catalyst. Suitable hardeners are polyhydric phenols, primary and secondary polyamines, polyamides, polymercaptans, and the like. Suitable catalysts are alkalies, amines, quaternary ammonium compounds, and the like. Primary and secondary amines can act as both hardeners and catalysts.

For the preparation of thermosetting compositions the hardener should be selected with reference to the functionality of the polyglycidyl amine. A difunctional amine, such as diglycidyl aniline, requires a hardener having a functionality greater than two, such as, for example, a trihydric phenol or trifunctional amine. On the other hand, a glycidyl amine such as N,N,N',N'-tetraglycidyl-4,4'-diamino diphenyl methane, a tetrafunctional amine, can be cured with a difunctional hardener, such as a dihydric phenol or a dihydric amine.

Mixtures of diglycidyl amines and diglycidyl ethers can be hardened with difunctional hardeners, provided the diglycidyl amine is present in an amount not over 30% by weight of the mixture of such diglycidyl amines and ethers.

In preparing the thermosetting compositions of this invention, the glycidyl derivatives are mixed with the hardener in proportions from about 0.7 to 1.3 of the stoichiometric proportions, the lower proportions being permissible for the amine derivative when hardeners having a functionality greater than two are used.

The mixing of the glycidyl derivatives may be done either at room temperature (25° C.) or at elevated temperatures up to about 100° C. The catalyst or hardener is then added, either as such or in solution in suitable solvents.

The composition is then poured into a suitable mold and cured at temperatures from room temperature to about 200° C., depending on the reactivity of the hardener and catalyst. Normally, the curing, if at elevated temperatures, is conducted by raising the temperature gradually to the final temperature, and then holding it thereat for a period of hours. For example, the preferred curing cycle with phenolic hardeners and aromatic amines is about 2½ hours at 100° C. and two hours at 150 C. With aliphatic polyamine hardeners, the curing cycle is one hour at room temperature, followed by two hours at 50° C., followed by two hours at 80° C. and, finally, three hours at 120°–150° C.

The polyglycidyl amines herein have found especial usefulness in combination with epoxy ethers of polyhydric phenols having a 1,2-epoxy equivalency greater than one, e.g. the glycidyl ethers of bisphenols, in the preparation of casting compositions which can be cured to products having unexpected high heat distortion and good chemical resistance. Thus, diglycidyl aniline has been incorporated as a reactive diluent with the glycidyl ethers of bisphenols in the preparation of casting compositions. Such compositions have unexpectedly higher heat distortion values than compositions in which a comparable amount of a reactive diluent such as butyl glycidyl ether is employed. This is illustrated in Examples III, IV, V and VI, which are illustrative of comparable compositions prepared using in Examples III and V diglycidyl aniline as the reactive diluent and in Examples IV and VI butyl glycidyl ether. It will be noted that in Examples III and V, the compositions, which have been prepared in accordance with the present invention, have higher heat distortion values than the compositions of Examples IV and VI, which are illustrative of known compositons.

EXAMPLE III 88.6 grams (0.46 mole C—C)
          \ /
           O of diglycidyl ether of bis-(4-hydroxyphenyl)-2,2-propane (also referred to as bisphenol A) epoxy content 88%, 11.4 grams (0.09 mole C—C)
          \ /
           O of diglycidyl aniline (epoxy content 83%); and 53 grams (0.465 mole OH) of bisphenol A, di-(4-hydroxy phenyl) dimethyl methane, were mixed together and heated at 110° C. to solution. The mixture was cooled to 60° C. and 2.8 cc. of a methyl alcohol solution of potassium hydroxide (0.3 gram KOH/cc.) was added and then the mixture was heated under reduced pressure at 65° C. until the alcohol had volatilized. The mixture was cast into ⅛" and ¼" slabs and cured 2½ hours at 100° C., an additional two hours at 120° C. The A.S.T.M. heat distortion value (265 p.s.i.) of a sample was 92° C.

EXAMPLE IV 88.6 grams of the diglycidyl ether of bisphenol A, 11.4 grams of butyl glycidyl ether

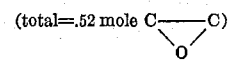

and 50 grams of bisphenol A (0.44 mole OH) were mixed together and heated to solution as in Example III. Potassium hydroxide as in Example III was added as catalyst and the mixture was cast and cured as in Example III. A.S.T.M. heat distortion value (264 p.s.i.) was 63° C.

EXAMPLE V 88.6 grams

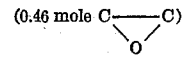

of diglycidyl ether of bisphenol A, and 11.4 grams

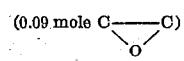

of diglycidyl aniline were mixed and deaerated at 40°–60° C. 25 grams of a hardener, comprising a liquid product formed by reacting about equal parts by weight of the diglycidyl ether of bisphenol A and diethylene triamine at about 40° C. to 75° C. until the reaction is substantially complete, the resulting hardener having a molar NH equivalent of about 45.5 grams, was added and the composition was cast into ⅛" and ¼" thick slabs which were cured one hour at room temperature, two hours at 50° C., two hours at 80° C. and then three hours at 120° C. A.S.T.M. heat distortion value (264 p.s.i.) was 117° C.

EXAMPLE VI 88.6 grams of diglycidyl ether of bisphenol A and 11.4 grams of butyl glycidyl ether were mixed and deaerated at 40°–60° C. 25 grams of a hardener as in Example V was added and the composition cast and cured as in Example V. A.S.T.M. heat distortion value (264 p.s.i.) was 75° C.

If more than 30% by weight of the composition of glycidyl amine is used to obtain compositions of the desired viscosity the other ingredients being similar, it will generally be found that such compositions exhibit somewhat lower mechanical properties. However, in amounts up to 30%, advantageously between 10 and 20%, the mechanical properties of the glycidyl amine-diluted compositions compare favorably with those casting compositions prepared without reactive diluent. This is illustrated in Table III where the diluted compositions prepared in accordance with this invention as described in Examples III and V are compared with undiluted compositions prepared as described in Examples VII and VIII, the latter two examples being illustrative of known compositions.

EXAMPLE VII 100 grams

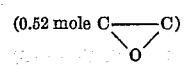

of the diglycidyl ether of bisphenol A of Examples III and V and 50 grams (0.44 mole OH) of bisphenol A were mixed together and heated at 110° C. to solution. The mixture was cooled to 60° C. and 2.7 cc. of a methyl alcohol solution of KOH (0.3 gram KOH/cc.) was added and then the mixture was heated at 65° C. under reduced pressure to volatilize the alcohol. The mixture was then cast into slabs and cured 2½ hours at 100° C. and an additional two hours at 120° C.

EXAMPLE VIII 106 grams of the diglycidyl ether of bisphenol A

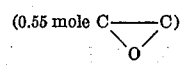

was deaerated at 40°–60° C. and 25 grams of the hardener described in Example V was added. The composition was cast in ⅛" and ¼" slabs and cured as described in Example V.

TABLE III

*Properties of compositions diluted with diglycidyl aniline and undiluted*

|  | Ex. III | Ex. VII | Ex. V | Ex. VIII |
|---|---|---|---|---|
| Viscosity (Est. at 25° C.) | 62,000 | 200,000 | 4,500 | 24,800 |
| Flexural Strength (p.s.i.) | 17,450 | 16,200 | 19,200 | 17,000 |
| Mod. of Elas. (p.s.i.×10⁻⁵) | 0.48 | 0.39 | 0.49 | 0.45 |
| Work to Break (ft./lb.) (⅛ x ½ x 4) | 12.1 | 5.10 | 3.14 | 1.3 |
| Izod Impact at 77°F. (ft. No./in. Notch) | 0.84 | 1.0–1.5 | 0.26 | 0.34 |
| ASTM Heat Dist. (°C.) (264 p.s.i.) | 92 | 85 | 118 | 98 |

Compositions in which diglycidyl aniline is the reactive diluent were not adversely affected as regards chemical resistance as compared to undiluted compositions as will be noted from Table IV. On the other hand, compositions diluted with butyl glycidyl ether had considerably decreased resistance, particularly to organic solvents such as ethanol, acetone, ethyl acetate, ethylene dichloride, chloroform and acetic acid.

TABLE IV

*Chemical resistance properties of compositions diluted with diglycidyl aniline (Ex. III), butyl glycidyl ether (Ex. IV) and undiluted (Ex. VII)*

| Composition | Ex. III | Ex. IV | Ex. VII |
|---|---|---|---|
| Chemical Resistance (percent wt. increase after 7 days' immersion at room temp.): |  |  |  |
| Distilled H₂O | 0.37 | 0.48 | 0.43 |
| 10% NaOH | 0.34 | 0.35 | 0.36 |
| 30% H₂SO₄ | 0.85 | 0.94 | 0.78 |
| 95% Ethanol | 0.28 | 1.78 | 0.24 |
| Acetone | 0.45 | 6.24 | 0.47 |
| Ethyl Acetate | 0.04 | 0.50 | 0.04 |
| Ethylene Dichloride | 0.43 | 14.1 | 0.56 |
| Chloroform | 0.66 | (¹) | 1.25 |
| 10% NH₄OH | 0.35 | 0.44 | 0.41 |
| Glacial Acetic Acid | 1.88 | 8.05 | 2.03 |
| Toluene | 0.14 | 0.09 | 0.12 |

¹ Edges disintegrated.

Compositions using other glycidyl amines, for example N,N-diglycidyl p-toluidene and N,N-diglycidyl m-chloroaniline were prepared after the manner described in Example I. Table V lists the properties of such compositions, the ingredients of these compositions being the same as given in Example III except for the diluent which was the glycidyl amine listed in the table, incorporating the same amount as the diglycidyl aniline given in Example III. For comparison, the properties of a composition using diglycidyl aniline are included.

TABLE V

*Properties of modified epoxy systems with bisphenol A hardener diluted with diglycidyl amines*

| Diluent | N, N Diglycidyl Aniline | N, N Diglycidyl p-Toluidine | N, N Diglycidyl m-chloro Aniline |
|---|---|---|---|
| Purity of Diluent (percent Theoretical Epoxy) | 97 | 91 | 80 |
| Viscosity of Diluent (cst.) | 46.9 | 55.8 | 520 |
| Viscosity of Epoxy [1] Component (cst.) at 25° C | 4,080 | 4,380 | 6,540 |
| Mechanical Properties of Castings: [2,3] | | | |
| Flexural Strength (p.s.i.) | 18,400 | 18,700 | 18,100 |
| Mod. of El. (p.s.i.×10$^{-6}$) | 0.45 | 0.43 | 0.45 |
| Work to Break (ft./lb.) (¼ x ½ x 4) | 8.6 | 7.2 | 5.4 |
| Izod Impact (ft. lb./in. width) at 77° F | 0.47 | 0.58 | 0.43 |
| ASTM Heat Dist. (° C.) (264 p.s.i.) | 92 | 86.5 | 86 |
| Rockwell Hardness | M88 | M86 | M87 |

[1] Viscosity of diglycidyl ether and glycidyl amine mixture without hardener.
[2] Catalyst 0.6% KOH.
[3] Cure: 2½–3 hours at 95°–100° C., annealed 3 hours at 120° C.

The following examples are illustrative of casting compositions using the tetraglycidyl derivative of 4,4'-diamino diphenyl methane.

Example IX illustrates the use of said tetraglycidyl amine in admixture with the diglycidyl ether of a polyhydric phenol; Example X its use in admixture with diglycidyl aniline, Example XI its use as such using bisphenol as a hardener, and Example XII its use, using an aromatic amine hardener.

All of these compositions are particularly characterized by the property of yielding, on curing, materials having high heat distortion values ranging from 95° C. to values in excess of 145° C.

EXAMPLE IX

A mixture of 88.6 grams of the diglycidyl ether of bisphenol A (epoxy content 88.1%), 11.4 grams of the tetraglycidyl bisaniline F (epoxy content 89% from Ex. II) and 52.7 grams of bisphenol A was heated to 120° C. to effect solution and then cooled to 60° C. Then 3.1 cc. of methanolic KOH (0.3 gram KOH/cc.) was added and the resulting mixture was heated to 68° C. under reduced pressure (29" Hg) to strip off volatiles. The residue was cast into plaques ¼" thick and cured for three hours at 95° C., then annealed three hours at 120° C. A test sample had the following mechanical properties:

| | |
|---|---|
| Flexural strength (p.s.i.) | 15,200 |
| Mod. of elasticity (p.s.i.×10$^{-6}$) | 0.40 |
| Work to break (ft. lbs.) (¼ x ½ x 4) | 2.65 |
| ASTM heat distortion (264 p.s.i.) ° C | 95 |
| Rockwell hardness | M90 |

EXAMPLE X

A mixture of 88.6 grams of tetraglycidyl bisaniline F (prepared after the manner described in Ex. II) (86% epoxy content), 11.4 grams of diglycidyl aniline (97% epoxy content) (prepared as described in Ex. I) and 73 grams of bisphenol A was heated to 120° C. to effect solution and then cooled to 60° C. 4 cc. of mehanolic KOH (0.3 gram KOH/cc.) was added and the mixture was heated to 70° C. under reduced pressure (29" Hg) to remove volatiles. The residue was cast into slabs ¼" thick and cured three hours at 95° C. and annealed three hours at 120° C. A test sample had an ASTM heat distortion value of 137° C. and a Rockwell hardness of M111.

EXAMPLE XI

A mixture of 390 grams of tetraglycidyl bisaniline F (82% epoxy content) and 342 grams of bisphenol A dissolved in 200 cc. mechanol was stirred to effect solution and then heated to 65° C. under reduced pressure (28" Hg) to remove volatiles. 14 cc. of methanolic KOH (0.3 g. KOH/cc.) was then added and the contents was heated to 70° C. under reduced pressure (28" Hg). The residue was cast into plaques ¼" thick and ⅛" thick. After curing three hours at 110° C. and then annealing for three hours at 150° C., a test sample had the following mechanical properties:

| | |
|---|---|
| A.S.T.M. heat distortion (264 p.s.i.) | No deflection at 145° C. |
| Mod. of el. (p.s.i.×10$^{-6}$) | 0.40. |
| Flexural strength (p.s.i.) | 20,300. |
| Flexural work to break (ft./lb.) | 4.2. |
| Izod impact (ft. lb./in. notch) at— | |
| 77° F | 0.24. |
| 0° F | 0.27. |
| −20° F | 0.28. |

The electrical properties of a test sample were as follows:

| Cycles per second | 60 | 10$^3$ | 10$^6$ |
|---|---|---|---|
| Power Factor | .0121 | .0178 | .0280 |
| Dielectric Constant | 4.07 | 3.97 | 3.53 |
| Loss Factor | .049 | .0703 | .0990 |

Dielectric strength (s./s. volts/ml.) 322, D.C. resistance (megohms cm.), 2.5×10$^8$.
A.S.T.M. arc resistance (sec.), 75.

EXAMPLE XII

A mixture of 180 grams of tetraglycidyl bisaniline F (86% epoxy content) and 72 grams of bisaniline F was heated to 90° C. to effect solution and then cast into ¼" and ⅛" thick slabs. After curing for three hours at 95° C., and annealing 1½ hours at 150° C., a test sample had the following mechanical and electrical properties:

Mechanical properties:
  Flexural strength (p.s.i.) _____ 16,200.
  Mod. of elasticity (p.s.i.×10$^6$) _____ 0.42.
  Izod impact at 77° F. (ft. lb./in. notch) _____ 0.2.
  A.S.T.M. heat distortion _____ No deflection at 145° C.

Electrical properties:

| Cycles per second | 60 | 10$^3$ | 10$^6$ |
|---|---|---|---|
| Power Factor | .0112 | .0194 | .0253 |
| Dielectric Constant | 4.49 | 4.37 | 4.03 |
| Loss Factor | .0504 | .0855 | .102 |

| | |
|---|---|
| D.C. resistivity, megohms | 1.2×10$^8$ |
| Dielectric strength (s./s. volts/mil) | 365 |
| Arc resistance (A.S.T.M.) sec | 121 |

The following example illustrates the preparation of a thermosetting casting composition using a diglycidyl amine with a hardener having a functionality greater than two.

EXAMPLE XIII

A mixture of 123 grams diglycidyl aniline (83% epoxy content) prepared as described in Example I and 50 grams of bisaniline F, was heated to 60° C. to effect solution and then cast into ¼" and ⅛" thick slabs. The slabs were cured three hours at 100° C. and then annealed three hours at 160° C. A test sample had the following physical properties:

| | |
|---|---|
| Viscosity of combination at 25° C. (before casting) cst | 550 |
| Mechanical properties of cured casting: | |
| Flexural strength (p.s.i.) | 22,900 |
| Mod. of elasticity (p.s.i.×10$^{-6}$) | 0.70 |
| Work to break (ft/lb.) (¼" x ½" x 4") | 1.95 |

Izod impact (ft. lb./in. notch) at—
| | |
|---|---|
| 77° F | 0.22 |
| 0° F | 0.23 |
| −20° F | 0.23 |
| Rockwell hardness | M116 |
| A.S.T.M. heat distortion pt ° C | 125 |

Electrical properties:

| Cycles per second | 60 | 10³ | 10⁶ |
|---|---|---|---|
| Power Factor | .006 | .0102 | .0145 |
| Dielectric Constant | 3.85 | 3.79 | 3.76 |
| Loss Factor | 0.23 | 0.39 | .053 |

| | |
|---|---|
| D.C. resistivity, megohms, cms | $7.4 \times 10^7$ |
| Dielectric strength (s./s. volts/mil) | 439 |
| ASTM arc resistance sec | 86 |

Chemical resistance (percent wt. increase of 1″ × 3″ × ⅛″ piece after 7 days' immersion at 25° C.):

| | |
|---|---|
| Distilled H₂O | 0.37 |
| 10% NaOH | 0.33 |
| 30% H₂SO₄ | 14.9 |
| 95% ethanol | 0.16 |
| Acetone | 0.11 |
| Ethyl acetate | 0.06 |
| Ethylene dichloride | 0.11 |
| Chloroform | 0.12 |
| 10% NH₄OH | 0.41 |
| Glacial acetic | 0.00 |
| Toluene | 0.10 |

The foregoing illustrates this invention, which, however, is not to be limited thereby but is to be construed as broadly as permissible in view of the prior art and limited solely by the appended claims.

What is claimed is:

1. The process for producing polyglycidyl amines having an epoxy content of at least about 80%, which comprises reacting a primary aromatic amine with epichlorohydrin, the epichlorohydrin being present in an amount at least equal to the number of moles of the primary aromatic amine multiplied by twice the number of primary amine groups to produce the corresponding chlorohydrin amine intermediate and reacting the resulting amine chlorohydrin with alkali to effect dehydrochlorination.

2. The process of claim 1, wherein the primary aromatic amine and epichlorohydrin are reacted in the presence of water.

3. The process of claim 1, wherein the primary aromatic amine employed is aniline.

4. The process of claim 1, wherein the primary aromatic amine employed is 4,4′-diamino diphenyl methane.

5. The process of claim 2, wherein the primary aromatic amine employed is aniline.

6. The process of claim 2, wherein the primary aromatic amine employed is 4,4′-diamino diphenyl methane.

7. The process for producing diglycidyl aniline having an epoxy content of at least about 80%, which comprises reacting aniline with epichlorohydrin in the proportion of about 1 mole of aniline to at least 2 moles of epichlorohydrin and in the presence of a compatible amount of water at a reaction temperature not in excess of 80° C. to form aniline chlorohydrin; and then reacting the aniline chlorohydrin with sufficient aqueous alkali hydroxide to effect substantially complete dehydrochlorination, and separating the thus-formed diglycidyl aniline from the mixture.

8. The process for producing N,N,N′,N′-tetraglycidyl 4,4′-diamino diphenyl methane having an epoxy content of at least 80%, which comprises reacting 4,4′-diamino diphenyl methane with epichlorohydrin in the proportion of about 1 mole of the former to about 8 moles of the latter and in the presence of a compatible amount of water, at a temperature not in excess of 80° C. to form the chlorohydrin of the starting amine; and then reacting the resulting chlorohydrin with sufficient aqueous alkali hydroxide to effect substantially complete dehydrochlorination, and separating the thus-formed tetraglycidyl diamino diphenyl methane from the mixture.

9. A heat-curable resinous composition comprising a diglycidyl aromatic amine having an epoxy content of at least about 80% and a hardening agent for said amine, said agent being selected from the group consisting of phenols, aliphatic amines, mercaptans, aromatic primary amines, and amides having a functionality greater than 2.

10. A heat-curable resinous composition comprising a polyglycidyl aromatic amine having an average of more than 2 epoxy groups per mole and an epoxy content of at least about 80%, and a hardening agent for said amine, said agent being selected from the group consisting of phenols, aliphatic amines, mercaptans aromatic primary amines and amides having a functionality greater than 1.

11. A heat-curable resinous composition comprising a polyglycidyl aromatic amine having an epoxy content of at least about 80%, a glycidyl ether of a polyhydric phenol having a 1,2-epoxy equivalency greater than 1, and a hardening agent for said amine and ether, said hardening agent being selected from the group consisting of phenols, aliphatic amines, mercaptans, aromatic primary amines, and amides having a functionality of at least 2.

12. A heat-curable resinous composition comprising diglycidyl aniline having an epoxy content of at least about 80%, diglycidyl ether of bis-(4-hydroxyphenyl)-2,2-propane, and a hardening agent for said substances, said hardening agent being selected from the group consisting of phenols, aliphatic amines, mercaptans, aromatic primary amines, and amides having a functionality of at least 2.

13. A heat-curable resinous composition comprising N,N,N′,N′-tetraglycidyl 4,4′-diamino diphenyl methane having an epoxy content of at least about 80%, and a hardening agent therefor, said hardening agent being selected from the group consisting of phenols, aliphatic amines, mercaptans, aromatic primary amines, and amides having a functionality greater than 1.

14. The resinous heat cured product of the composition of claim 9, said resinous product having high heat distortion and good chemical resistance.

15. The resinous heat cured product of the composition of claim 13, said resinous product having high heat distortion and good chemical resistance.

16. The resinous heat cured product of a composition comprising N,N,N′,N′-tetraglycidyl 4,4′-diamino diphenyl methane having an epoxy content of at least 80%, the diglycidyl ether of bis-(4-hydroxyphenyl)-2,2-propane, and an alkali hydroxide.

17. The resinous heat cured product of a composition comprising a polyglycidyl aromatic amine having an epoxy content of at least about 80%, a glycidyl ether of a polyhydric phenol having a 1,2-epoxy equivalency greater than 1, and a hardening agent for said amine and ether, said hardening agent being selected from the group consisting of phenols, aliphatic amines, mercaptans, aromatic amines, and amides.

18. The product of claim 17, wherein said composition contains an amount of polyglycidyl aromatic amine up to about 30% by weight of the total weight of said composition.

19. The product of claim 17, wherein diglycidyl aniline is the polyglycidyl amine employed.

20. The product of claim 18, wherein diglycidyl aniline is the polyglycidyl amine employed.

21. The resinous product obtained by heat-curing a composition comprising N,N-diglycidyl aniline having an epoxy content of at least 80%, diglycidyl ether of bis-(4-hydroxyphenyl)-2,2-propane, and diethylene triamine.

22. The process for producing polyglycidyl amines having an epoxy content of at least about 80%, which comprises reacting a primary aromatic amine with epichlorohydrin, said epichlorohydrin being present in an amount at least equal to the number of moles of the primary aromatic amine multiplied by twice the number of primary amine groups to produce the corresponding chlorohydrin amine intermediate, removing the excess epichlorohydrin and dehydrochlorinating the said chlorohydrin amine with alkali.

References Cited in the file of this patent

UNITED STATES PATENTS

| | | |
|---|---|---|
| 1,977,251 | Stallmann | Oct. 16, 1934 |
| 1,977,252 | Stallmann | Oct. 16, 1934 |
| 1,977,253 | Stallmann | Oct. 16, 1934 |
| 2,615,007 | Greenlee | Oct. 21, 1952 |
| 2,615,008 | Greenlee | Oct. 21, 1952 |
| 2,668,807 | Greenlee | Feb. 9, 1954 |
| 2,767,157 | Masters | Oct. 16, 1956 |
| 2,897,179 | Schechter et al. | July 28, 1959 |